(12) United States Patent
Taha et al.

(10) Patent No.: US 12,379,555 B2
(45) Date of Patent: Aug. 5, 2025

(54) DETACHABLE CONNECTOR FOR CO-PACKAGED OPTICS

(71) Applicant: Teramount Ltd., Jerusalem (IL)

(72) Inventors: Hesham Taha, Jerusalem (IL); Abraham Israel, Jerusalem (IL)

(73) Assignee: Teramount Ltd., Jerusalem (IL)

( * ) Notice: Subject to any disclaimer, the term of this patent is extended or adjusted under 35 U.S.C. 154(b) by 219 days.

(21) Appl. No.: 17/512,200

(22) Filed: Oct. 27, 2021

(65) Prior Publication Data
US 2023/0130045 A1    Apr. 27, 2023

(51) Int. Cl.
G02B 6/42    (2006.01)

(52) U.S. Cl.
CPC ........... *G02B 6/4214* (2013.01); *G02B 6/423* (2013.01); *G02B 6/4239* (2013.01); *G02B 6/4243* (2013.01)

(58) Field of Classification Search
CPC ...................................................... G02B 6/42
USPC ...................................................... 385/88
See application file for complete search history.

(56) References Cited

U.S. PATENT DOCUMENTS

| | | |
|---|---|---|
| 4,744,618 A | 5/1988 | Mahlein |
| 4,763,977 A | 8/1988 | Kawasaki et al. |
| 5,627,931 A | 5/1997 | Ackley et al. |
| 5,913,002 A | 6/1999 | Jiang |
| 5,939,782 A | 8/1999 | Malladi |
| 6,052,397 A | 4/2000 | Jeon et al. |
| 6,122,417 A | 9/2000 | Jayaraman et al. |
| 6,198,864 B1 | 3/2001 | Lemoff et al. |
| 6,253,009 B1 | 6/2001 | Lestra et al. |
| 6,271,970 B1 | 8/2001 | Wade |
| 6,423,956 B1 | 7/2002 | Mandella et al. |

(Continued)

FOREIGN PATENT DOCUMENTS

| | | |
|---|---|---|
| CA | 1253377 A | 5/1989 |
| CN | 1387626 A | 12/2002 |

(Continued)

OTHER PUBLICATIONS

International Search Report and Written Opinion of International Searching Authority for PCT/IB2021/062224,ISA/IL, Jerusalem, Israel, Dated: Mar. 17, 2022.

(Continued)

*Primary Examiner* — Kaveh C Kianni
(74) *Attorney, Agent, or Firm* — Banner & Witcoff, Ltd.

(57) ABSTRACT

Apparatus and method for detachably connecting at least one optical fiber of a detachable photonic plug to a photonic integrated circuit (PIC). The detachable photonic plug comprises: a detachable plug die; an optically transparent spacer coupled to the detachable plug die; and at least one optical fiber held between the detachable plug die and the spacer. On the PIC side, apparatus includes a receptacle adapted to receive a detachable photonic plug adapted to couple at least one optical fiber to a photonic integrated circuit (PIC); and a photonic bump of the PIC, the photonic bump having a least one fine alignment feature. The method comprises permanently mounting a receptacle over at least a portion of the PIC; after completion of mounting, inserting the detachable photonic plug into the receptacle; and after the detachable photonic plug is inserted in the receptacle, securing the detachable photonic plug in the receptacle.

15 Claims, 9 Drawing Sheets

(56) References Cited

U.S. PATENT DOCUMENTS

| | | |
|---|---|---|
| 6,571,039 B1 | 5/2003 | Al-hemyari et al. |
| 6,600,845 B1 | 7/2003 | Feldman et al. |
| 6,654,533 B1 | 11/2003 | Koteles et al. |
| 6,801,693 B1 | 10/2004 | Jacobowitz et al. |
| 6,832,031 B2 | 12/2004 | Smaglinski |
| 6,862,092 B1 | 3/2005 | Ibsen et al. |
| 6,888,988 B2 | 5/2005 | Vancoille et al. |
| 6,941,047 B2 | 9/2005 | Capewell et al. |
| 6,960,031 B2 | 11/2005 | McFarland et al. |
| 7,050,304 B2 | 5/2006 | Hsu et al. |
| 7,058,275 B2 | 6/2006 | Sezerman et al. |
| 7,104,703 B2* | 9/2006 | Nagasaka ............ G02B 6/4214 385/88 |
| 7,139,448 B2 | 11/2006 | Jain et al. |
| 7,260,328 B2 | 8/2007 | Kropp |
| 7,288,756 B2 | 10/2007 | Sherrer et al. |
| 7,317,746 B2 | 1/2008 | Ericson et al. |
| 7,358,109 B2 | 4/2008 | Gallup et al. |
| 7,366,380 B1 | 4/2008 | Peterson et al. |
| 7,447,404 B2 | 11/2008 | Miller |
| 7,567,391 B1 | 7/2009 | Strauch, III et al. |
| 7,729,581 B2* | 6/2010 | Rolston ................ G02B 6/4232 385/52 |
| 7,853,101 B2 | 12/2010 | Carothers |
| 7,970,041 B2 | 6/2011 | Arimoto et al. |
| 8,000,565 B2 | 8/2011 | Liu |
| 8,117,982 B2 | 2/2012 | Gruber et al. |
| 8,390,806 B1 | 3/2013 | Subramanian |
| 8,422,836 B2 | 4/2013 | Riester et al. |
| 8,471,467 B2 | 6/2013 | Boerner |
| 8,548,287 B2 | 10/2013 | Thacker et al. |
| 8,582,934 B2 | 11/2013 | Adler et al. |
| 8,803,269 B2 | 8/2014 | Shastri et al. |
| 8,834,146 B2 | 9/2014 | Saha et al. |
| 8,836,942 B2 | 9/2014 | Quan et al. |
| 8,929,693 B2 | 1/2015 | Shin et al. |
| 9,039,304 B2 | 5/2015 | Ko et al. |
| 9,099,581 B2 | 8/2015 | Na et al. |
| 9,285,554 B2 | 3/2016 | Doany et al. |
| 9,429,725 B2 | 8/2016 | Shao et al. |
| 9,442,255 B2 | 9/2016 | Pommer et al. |
| 9,496,248 B2 | 11/2016 | Lee et al. |
| 9,500,821 B2 | 11/2016 | Hochberg et al. |
| 9,563,028 B2 | 2/2017 | Contag |
| 9,658,396 B2 | 5/2017 | Rong et al. |
| 9,698,564 B1 | 7/2017 | Shubin et al. |
| 9,703,041 B2 | 7/2017 | Smith et al. |
| 9,739,962 B2* | 8/2017 | Brenner ................ G02B 6/4284 |
| 9,791,645 B2 | 10/2017 | Meadowcroft et al. |
| 9,804,334 B2 | 10/2017 | Israel et al. |
| 9,804,348 B2 | 10/2017 | Badihi et al. |
| 9,864,133 B2 | 1/2018 | Patel et al. |
| 9,874,688 B2 | 1/2018 | Doerr et al. |
| 9,946,028 B2 | 4/2018 | Chen et al. |
| 10,054,740 B2 | 8/2018 | Chetrit et al. |
| 10,069,279 B2 | 9/2018 | Malcolm et al. |
| 10,222,552 B2 | 3/2019 | Djordjevic et al. |
| 10,481,334 B2 | 11/2019 | Israel et al. |
| 10,502,905 B1 | 12/2019 | Mathai et al. |
| 10,641,953 B1* | 5/2020 | Vashishtha ............ G02B 6/4226 |
| 10,746,934 B2* | 8/2020 | Patel ........................ G02B 6/13 |
| 10,754,107 B2 | 8/2020 | Li et al. |
| 10,866,363 B2 | 12/2020 | Israel et al. |
| 11,394,468 B2 | 7/2022 | Zhou et al. |
| 11,448,836 B2 | 9/2022 | Ji et al. |
| 11,585,991 B2 | 2/2023 | Israel et al. |
| 11,863,917 B2* | 1/2024 | Meister ................ G02B 6/423 |
| 2002/0079430 A1 | 6/2002 | Rossi |
| 2002/0118907 A1 | 8/2002 | Sugama et al. |
| 2002/0131180 A1 | 9/2002 | Goodman |
| 2002/0150320 A1 | 10/2002 | Kato |
| 2002/0164129 A1 | 11/2002 | Jackson |
| 2003/0002809 A1 | 1/2003 | Jian |
| 2003/0043157 A1 | 3/2003 | Miles |
| 2003/0044118 A1 | 3/2003 | Zhou et al. |
| 2003/0142896 A1 | 7/2003 | Kikuchi et al. |
| 2003/0222282 A1* | 12/2003 | Fjelstad ............ H01L 23/49805 257/200 |
| 2004/0114869 A1 | 6/2004 | Fike et al. |
| 2004/0144869 A1 | 7/2004 | Hennessy |
| 2004/0184704 A1 | 9/2004 | Bakir et al. |
| 2005/0025430 A1 | 2/2005 | Bhagavatula et al. |
| 2005/0162853 A1 | 7/2005 | Jain |
| 2005/0164131 A1 | 7/2005 | Yokouchi |
| 2005/0276613 A1 | 12/2005 | Welch et al. |
| 2006/0022289 A1 | 2/2006 | Badhei et al. |
| 2006/0239605 A1 | 10/2006 | Palen et al. |
| 2006/0251360 A1 | 11/2006 | Lu et al. |
| 2006/0280402 A1 | 12/2006 | Xia et al. |
| 2006/0285797 A1 | 12/2006 | Little |
| 2007/0103682 A1 | 5/2007 | Yoo |
| 2007/0160321 A1 | 7/2007 | Wu et al. |
| 2007/0223540 A1 | 9/2007 | Sudmeyer et al. |
| 2009/0178096 A1 | 7/2009 | Menn et al. |
| 2009/0262346 A1 | 10/2009 | Egloff et al. |
| 2009/0297093 A1 | 12/2009 | Webster et al. |
| 2010/0002987 A1 | 1/2010 | Hata et al. |
| 2010/0086255 A1 | 4/2010 | Ishizaka |
| 2011/0032598 A1 | 2/2011 | Horikawa et al. |
| 2011/0091167 A1 | 4/2011 | Nishimura |
| 2011/0170825 A1 | 7/2011 | Spector et al. |
| 2011/0280573 A1 | 11/2011 | Collings et al. |
| 2011/0293281 A1 | 12/2011 | Sakurai |
| 2012/0002284 A1 | 1/2012 | McColloch et al. |
| 2012/0063721 A1 | 3/2012 | Chen |
| 2012/0280344 A1 | 11/2012 | Shastri et al. |
| 2013/0044977 A1 | 2/2013 | Amit |
| 2013/0109083 A1 | 5/2013 | Llobera Adan |
| 2013/0129281 A1 | 5/2013 | Son et al. |
| 2013/0156370 A1 | 6/2013 | Kim et al. |
| 2013/0182998 A1 | 7/2013 | Andry et al. |
| 2013/0209026 A1 | 8/2013 | Doany et al. |
| 2013/0216180 A1 | 8/2013 | Tan et al. |
| 2014/0023098 A1 | 1/2014 | Clarkson et al. |
| 2014/0064559 A1 | 3/2014 | Sugasawa et al. |
| 2014/0176958 A1 | 6/2014 | Flanders et al. |
| 2014/0203175 A1 | 7/2014 | Kobrinsky et al. |
| 2014/0226988 A1 | 8/2014 | Shao et al. |
| 2014/0294342 A1 | 10/2014 | Offrein et al. |
| 2014/0363165 A1 | 12/2014 | Panotopoulos et al. |
| 2015/0050019 A1 | 2/2015 | Sengupta |
| 2015/0124336 A1 | 5/2015 | Kaufman |
| 2015/0125110 A1 | 5/2015 | Anderson et al. |
| 2015/0155423 A1 | 6/2015 | Matsuoka et al. |
| 2016/0109659 A1 | 4/2016 | Jiang |
| 2016/0119064 A1 | 4/2016 | Yamaji et al. |
| 2016/0131848 A1 | 5/2016 | Svilans |
| 2016/0161686 A1 | 6/2016 | Li et al. |
| 2016/0195677 A1 | 7/2016 | Panotopoulos et al. |
| 2016/0225477 A1 | 8/2016 | Banine et al. |
| 2016/0246004 A1 | 8/2016 | Kachru et al. |
| 2016/0306117 A1 | 10/2016 | Middlebrook et al. |
| 2016/0377821 A1 | 12/2016 | Vallance et al. |
| 2017/0017042 A1 | 1/2017 | Menard et al. |
| 2017/0017043 A1 | 1/2017 | Menard et al. |
| 2017/0102503 A1 | 4/2017 | Israel et al. |
| 2017/0131469 A1 | 5/2017 | Kobrinsky et al. |
| 2017/0160481 A1 | 6/2017 | Ling et al. |
| 2017/0207600 A1 | 7/2017 | Klamkin et al. |
| 2017/0294760 A1 | 10/2017 | Shubin et al. |
| 2018/0031791 A1 | 2/2018 | Israel et al. |
| 2018/0045891 A1 | 2/2018 | Israel et al. |
| 2018/0061691 A1 | 3/2018 | Jain et al. |
| 2018/0180829 A1 | 6/2018 | Gudeman |
| 2018/0217341 A1 | 8/2018 | Smith et al. |
| 2018/0259710 A1 | 9/2018 | Stabile et al. |
| 2018/0364426 A1 | 12/2018 | ten Have et al. |
| 2019/0146162 A1 | 5/2019 | Evans |
| 2019/0170937 A1 | 6/2019 | Menezo et al. |
| 2019/0265421 A1 | 8/2019 | Ji et al. |
| 2019/0324211 A1 | 10/2019 | Israel et al. |
| 2019/0339450 A1 | 11/2019 | Noriki et al. |
| 2020/0278508 A1 | 9/2020 | Israel et al. |
| 2020/0326491 A1 | 10/2020 | Psaila et al. |

(56) References Cited

U.S. PATENT DOCUMENTS

| | | | |
|---|---|---|---|
| 2020/0357721 A1* | 11/2020 | Sankman | H01L 25/0655 |
| 2021/0149128 A1 | 5/2021 | Schaevitz et al. | |
| 2021/0165165 A1 | 6/2021 | Israel et al. | |
| 2021/0239920 A1 | 8/2021 | Vallance et al. | |
| 2021/0263216 A1 | 8/2021 | Bishop et al. | |
| 2021/0392419 A1* | 12/2021 | Meister | G02B 6/423 |
| 2022/0026649 A1 | 1/2022 | Vallance et al. | |
| 2022/0226649 A1 | 7/2022 | Shalev et al. | |
| 2022/0390693 A1 | 12/2022 | Krähenbühl et al. | |
| 2022/0404546 A1* | 12/2022 | Krichevsky | G02B 6/30 |
| 2023/0018654 A1 | 1/2023 | Winzer et al. | |
| 2023/0021871 A1 | 1/2023 | Kuznia et al. | |
| 2023/0030105 A1 | 2/2023 | Aalto | |
| 2023/0043794 A1 | 2/2023 | Winzer et al. | |
| 2023/0072926 A1 | 3/2023 | Morrison et al. | |
| 2023/0077979 A1 | 3/2023 | Winzer | |
| 2023/0079458 A1 | 3/2023 | Debergh et al. | |
| 2023/0084003 A1 | 3/2023 | Taha et al. | |
| 2023/0094780 A1* | 3/2023 | Testa | G02B 6/421 |
| | | | 385/33 |
| 2023/0130045 A1 | 4/2023 | Taha et al. | |

FOREIGN PATENT DOCUMENTS

| | | |
|---|---|---|
| CN | 104459890 A | 3/2015 |
| EP | 2639978 A1 | 9/2013 |
| EP | 3316012 A1 | 5/2018 |
| EP | 3495861 A1 | 6/2019 |
| EP | 3521879 A1 | 8/2019 |
| EP | 4102273 A1 | 12/2022 |
| JP | 6462596 B2 | 1/2019 |
| KR | 20050007459 A | 1/2005 |
| KR | 20170081265 A | 7/2017 |
| RU | 2438209 C1 | 12/2011 |
| RU | 2485688 C2 | 6/2013 |
| RU | 2577669 C2 | 3/2016 |
| WO | 2001067497 A1 | 9/2001 |
| WO | 2013048730 A1 | 4/2013 |
| WO | 2018067703 A1 | 4/2018 |
| WO | 2018140057 A1 | 8/2018 |

OTHER PUBLICATIONS

Barwicz, et al., "Assembly of Mechanically Compliant Interfaces Between Optical Fibers and Nanophotonic Chips", IEEE 64th Electronics Components and Technology Conference, Orlando, Fl., May 27-30, 2014.

Bogaerts, "Helios Lecture: Coupling Light to Silicon Photonic Circuits", Silicon Photonics—PhD Course prepared within FP7-224312 Helios Project, Ghent University-IMECGhent, Belgium, Nov. 2009.

Camapa, CD-ROM, pp. 58, 59, 79, Russia, 2012.

Chrical Photonics., "Fiber Coupler Overview", Pinebrook, NJ, Jan. 2013.

Cunningham, et al., "Aligning Chips Face-to-Face for Dense Capacitive and Optical Communications", IEEE Transactions on Advanced Packaging, vol. 33, No. 2, May 2010.

First Chinese Foreign Office Action for Chinese Application No. 201980025948.3, Chinese National Intellectual Property Administration (CNIPA), Beijing City, China, Dated: Nov. 15, 2021.

Foreign Office Action and Search Report for ROC (Taiwan) Patent Application No. 105121625 dated Sep. 5, 2017 from IPO (Intellectual Property Office) of Taiwan.

Hou, et al., "Physics of Elliptical Reflectors at Large Reflection and Divergence Angles I: Their Design for Nano-Photonic Integrated Circuits and Application to Low-loss Low-crosstalk Waveguide Crossing", Northwestern University, Evanston, IL., Apr. 2012.

International Search Report and Written Opinion of Internationl Searching Authority for PCT/US2019/027871, ISA/RU, Moscow, Russia, Dated: Aug. 22, 2019.

Kopp, et al., "Silicon Photonic Circuits: On-CMOS Integration, Fiber Optical Coupling, and Packaging", IEEE Journal of Selected Topics in Quantum Electronics, Aug. 2010.

Kurata, et. al., "Prospect of Chip Scale Silicon Photonics Transceiver for High Density Multi-mode Wiring System", Photonics Electronics Technology Research Association (PETRA), Japan, 2015, pp. 1-7.

Nguyen, et al., "Silicon-based Highly-efficient Fiber-to-waveguide Coupler for High Index Contrast Systems", Applied Physics Letters, American Institute of Physics, downloaded Feb. 29, 2012, published online Feb. 24, 2006.

Notice of Deficiencies for EP Application No. 16854021.9 dated Jun. 24, 2019, EPO, Rijswijk, Netherlands.

O'Brien, "Silicon Photonics Fiber Packaging Technology", Photonics Packaging Group, Tyndall National Institute, Cork, Ireland, Sep. 2012.

PCL Connections LLC, all rights reserved, "In-Line Coupling Element (ICE) for Bonded Grating Coupling to Silicon PICs", Columbus, OH., May 2013.

The European Search Report for EP Application No. 16854021.9 dated Aug. 21, 2018, EPO, The Hague.

The First Chinese Office Action for Chinese Patent Application No. 2016800557192, Aug. 22, 2019, China, CNIPA.

The International Search Report and The Written Opinion for PCT/US2016/038047, ISA/RU, Moscow, Russia, Date of Mailing: Oct. 13, 2016.

The International Search Report and The Written Opinion for PCT/US2017/055146, ISA/RU, Moscow, Russia, Date of Mailing: Jan. 31, 2018.

Zimmerman, "State of the Art and Trends in Silicon Photonics Packaging", Silicon Photonics Workshop, Technische Universitat Berlin, May 2011.

Second Chinese Foreign Office Action for Chinese Application No. 2019800259483, Chinese National Intellectual Property Administration (CNIPA), Beijing City, China, Dated: May 31, 2022.

Noriki et al., "45-degree curved micro-mirror for vertical optical I/O of silicon photonics chip," Optics Express, vol. 27, No. 14, Dated: Jul. 8, 2019.

The International Search Report and the Written Opinion for PCT Application No. PCT/IL2022/051131, ISA/IL dated Jan. 12, 2023.

Miller, David "Self-aligning optics for integrated mode separation," Standfor University, IEEE 2015.

Francis, David G. "Laser Instrumentation in AEDC Test Facilities," Arnold Engineering Development Center, Dec. 1971.

McLaughlin, Dennis K. "Laser Doppler Velocmeter Measurements in a Turbulent Jet Exiting into a Cross Flow," Arnold Engineering Development Center, Jan. 1972.

The International Search Report and the Written Opinion for PCT Application No. PCT/IL2022/051360, ISA/IL dated Mar. 5, 2023.

The International Search Report and the Written Opinion for PCT Application No. PCT/IL2022/051358, ISA/IL dated Apr. 2, 2023.

Notice of Preliminary Rejection dated Jul. 19, 2023 for KR Application No. 10-2018-7007767.

Doerr et al. Silicon photonic integrated circuit for coupling to a ring-core multimode fiber for space-division mutliplexing. Bell Laboratories. ECOC Postdeadline Papers. 2011 OSA. (Year: 2011).

The International Search Report and the Written Opinion for PCT Application No. PCT/IL2023/051163, ISA/IL dated Jan. 11, 2024.

Tom Mitcheltree and Stephen Hardy. "Optical Connectivity Considerations for Co-Packaged Optics". Time Stamp: 23:42. May 6, 2021. https://event.webcasts.com/viewer/event.jsp?ei=1459224&tp_key=61326889cd.

USCONEC. "13950, Ferrule, PRIZM® LT 12F MM" https://www.usconec.com/products/ferrule-prizm-lt-12f-mm.

USCONEC. "15214, Mechanical Optical Interface (MOI) 10+ Gbps, PRIZM® LightTurn®". https://www.usconec.com/products/mechanical-optical-interface-moi-10plus-gbps-prizm-lightturn.

USCONEC. "15215, PRIZM® LightTurn® Mini Housing" https://www.usconec.com/products/prizm-lightturn-mini-housing.

USCONEC. "16349, Ferrule, PRIZM® LT 8F SM" https://www.usconec.com/products/ferrule-prizm-lt-8f-sm.

(56) References Cited

OTHER PUBLICATIONS

USCONEC. "Product Catalog" pp. 69 and 70. https://www.usconec.com/umbraco/rhythm/protectedfilesapi/download?path=%2ffiles%2fLiterature%2fUS_Conec_Product_Catalog.pdf.

USCONEC. Mechanical Optical Interface Customer Drawings. https://www.usconec.com/umbraco/rhythm/protectedfilesapi/download?path=%2ffiles%2fdrawings%2fC15214.pdf.

* cited by examiner

DETACHABLE CONNECTOR FOR CO-PACKAGED OPTICS

TECHNICAL FIELD

The present disclosure relates generally to coupling an optical fiber connector to a substrate, and more particularly to a detachable connector for co-packaged optics to couple optical fibers to an optoelectronic integrated circuit (IC).

BACKGROUND

Communications systems and datacenters are required to handle massive data at ever increasing speeds and ever decreasing costs. This often requires a large amount of space and entails high power consumption. To meet these demands, optical fibers and optical integrated circuits (ICs) such as, for example, a photonic integrated circuit (PIC) or integrated optical circuit, are used together with high speed electronic ICs. A PIC is a device that integrates multiple photonic functions in a manner that is similar to the way an electronic IC or radio frequency (RF) IC integrates different electronic or RF functions onto a single chip. PICs are typically fabricated using indium phosphide or silicon oxide ($SiO_2$), which allows for the integration of various optically active and passive functions on the same chip.

The coupling of PICs to optical fibers is not as well advanced as the integration and/or coupling of off-chip electronics to ICs. Specifically, the challenges facing the making of optical connections to a PIC are much more complex than merely connecting wire connections to electronic ICs which may be mounted on a printed circuit board (PCB). Some difficulties of connecting optical fibers to a PIC are inherent in the characteristics of optical packaging such as the assembly tolerance between PIC and the fiber connector.

Existing solutions utilize various techniques for connecting optical fibers to PICs. One technique uses various types of butt connections to connect fiber to the edge of a PIC. This may be achieved by connecting the butt of a fiber to a planar waveguide at the edge of PIC. This technique is efficient only if the cross sectional area of the propagating mode of the fiber and the waveguide area of the fiber core and the waveguide are of similar size. In most cases, this technique suffers from poor assembly tolerance.

Another technique suggests laying a section of fiber on top of the surface of PIC where the end of the fiber has been cut at an angle to form an angled tip. The angled tip has a flat surface which reflects a light beam down into a waveguide grating coupler disposed on the integrated circuit. The light beam is reflected off the reflective surface of the angled tip by total internal reflection. The waveguide grating coupler is designed to accept the slightly diverging light beam from the reflective surface of the angled tip of the fiber. The light beam can also propagate through the fiber to a chip coupler in the opposite direction, up from the substrate through the waveguide grating and into an optical fiber after bouncing off the reflective surface of the angled tip.

Disadvantageously, all of the above-noted techniques require precise alignment and active positioning of optical fiber with respect to PIC. As such, current techniques suffer from having very tight alignment tolerances as a requirement to gain an efficient connectivity between PIC and the fiber. For example, a misalignment between an optical fiber and a PIC of 1-2 microns (μm) would result in a signal loss of about 3 db. Furthermore, the alignment must be performed with expensive equipment or labor intensive assembly solutions. As a result, a mass production of PICs and/or optical couplers is not feasible.

Direct attach connection of fibers to PIC while useful for small numbers of fibers, e.g., ten or less, are generally unsuitable for use for connections tens or hundreds of fibers that would make up a fiber connector.

Another disadvantage of such prior art techniques for direct attach connection of fibers to PIC is that they are permanent connections, i.e., the fibers are effectively not removable after being attached. For example, a V-groove approach requires direct bonding of fiber on a system-in-package (SiP) chip. Such an arrangement also requires passing the fibers through at least one reflow process. Given that the connections are made prior to the reflow process, which is typically performed at 240° C. to 260° C., it is possible that the reflow process could harm the glass of the fibers.

A further disadvantage of such permanent attachments is that the successful yield of the connections is often low, which is problematic.

Yet an additional disadvantage of such connections is the fact that they are permanent, i.e., they are not detachable. However, the ability to remove such connections can be useful for maintenance and long term care.

Lastly, while detachable connections exist for use with multi-mode fibers as these multi-mode fibers have large tolerances, it is often desired to use single mode fiber for the various connections and single mode fibers have very small tolerances which further complicate, and make it a challenge, to provide a detachable connection.

It would therefore be advantageous to provide a fiber-to-chip optical coupling solution that would overcome the deficiencies of the existing solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a detachable photonic plug for coupling an optical fiber to a photonic integrated circuit (PIC), comprising: a detachable plug die; an optically transparent spacer coupled to the detachable plug die; and at least one optical fiber held between the detachable plug die and the spacer.

Certain embodiments disclosed herein include a receptacle adapted to receive a detachable photonic plug adapted to couple at least one optical fiber to a photonic integrated circuit (PIC); and a photonic bump of the PIC, the photonic bump having a least one fine alignment feature.

Certain embodiments disclosed herein include a method for detachably connecting at least one optical fiber of a detachable photonic plug to a photonic integrated circuit (PIC). The method comprises: permanently mounting a receptacle so that at least a portion of the receptacle extends over at least a portion of the PIC; after completion of mounting, inserting the detachable photonic plug into the receptacle; and after the detachable photonic plug is inserted in the receptacle, securing the detachable photonic plug in the receptacle.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
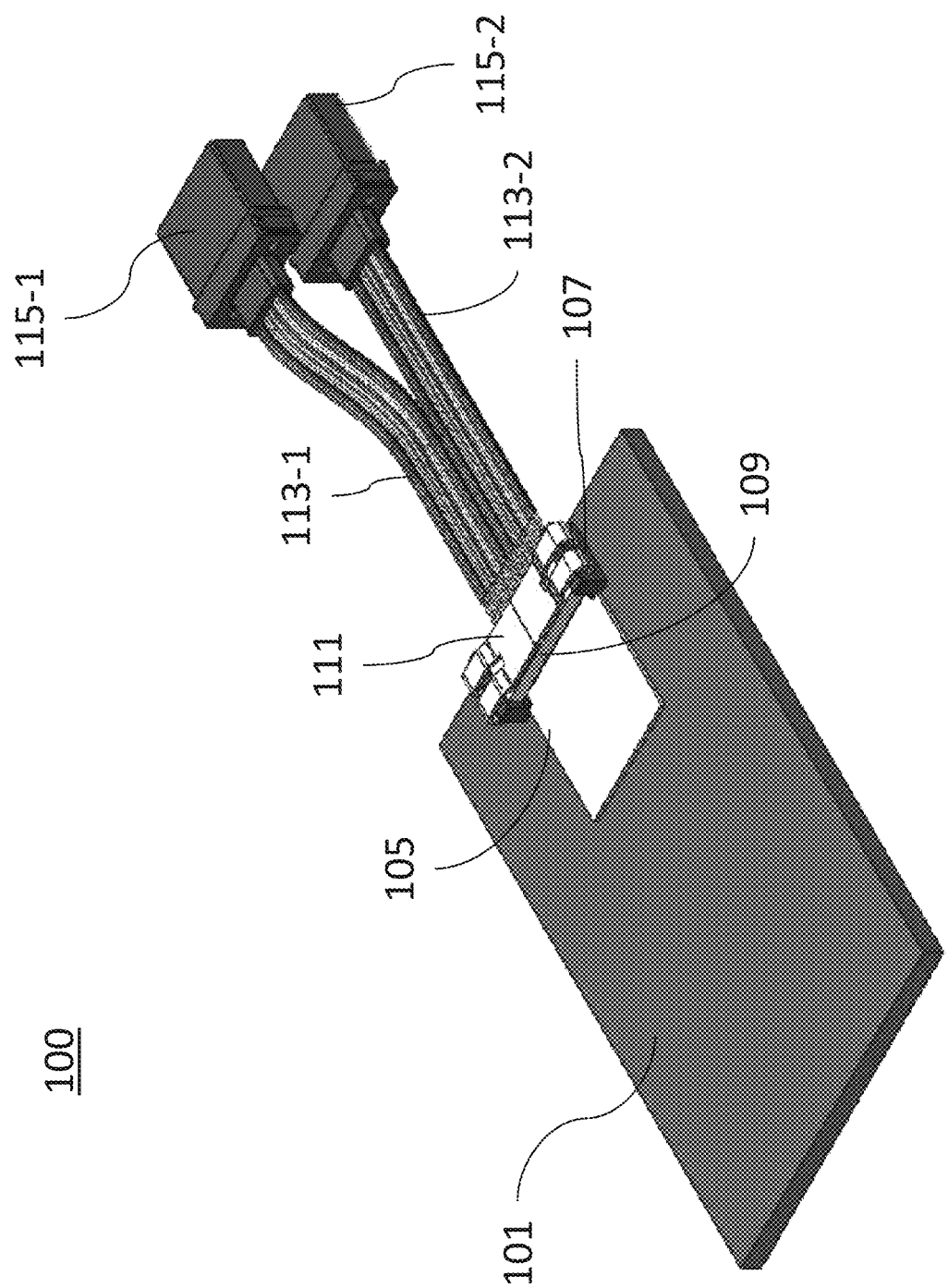
FIG. 1 shows an illustrative embodiment 100 of a fully assembled detachable connector for co-packaged optics that is coupled to a multi-chip module via a PIC.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Based on the problems stated above, a scalable single-mode fiber to chip assembling methodology is needed in applications where fiber high density or large port count is used, for example, co-packaged optical switch connectivity. Co-packaged optical connectivity brings multiple fibers closer to switch die or other types of die which may be packaged on an expensive packaging platform such as a Multi-Chip Module (MCM). Therefore, co-packaged optical connectivity should be compatible with standard chip packaging methodologies and equipment. In the disclosed embodiments, the fiber is separated from the MCM packaging steps, and the fiber and MCM packaging is kept to the last stage in a detachable way is not only unique, but also makes the process a scalable technology. In addition, advantageously, detachable connectors as disclosed herein makes it possible to assemble fibers after the high temperature reflow soldering process is completed. Further advantageously, the disclosed embodiments are suitable for use with single mode fibers.

Unless otherwise explicitly specified herein, the drawings are not drawn to scale. Also, identically numbered components within different ones of the FIGs. refer to components that are substantially the same.

FIG. 1 shows an illustrative embodiment 100 of a fully assembled detachable connector for co-packaged optics that is coupled to a multi-chip module via a PIC. Shown in FIG. 1 are a) MCM 101, b) PIC 105, c) receptacle 107, d) detachable plug die 109, e) removable clip 111, f) optical fibers 113 arranged into fiber ribbons 113-1 and 113-2, and g) fiber ribbon connector couplers 115-1 and 115-2.

Figure 2:
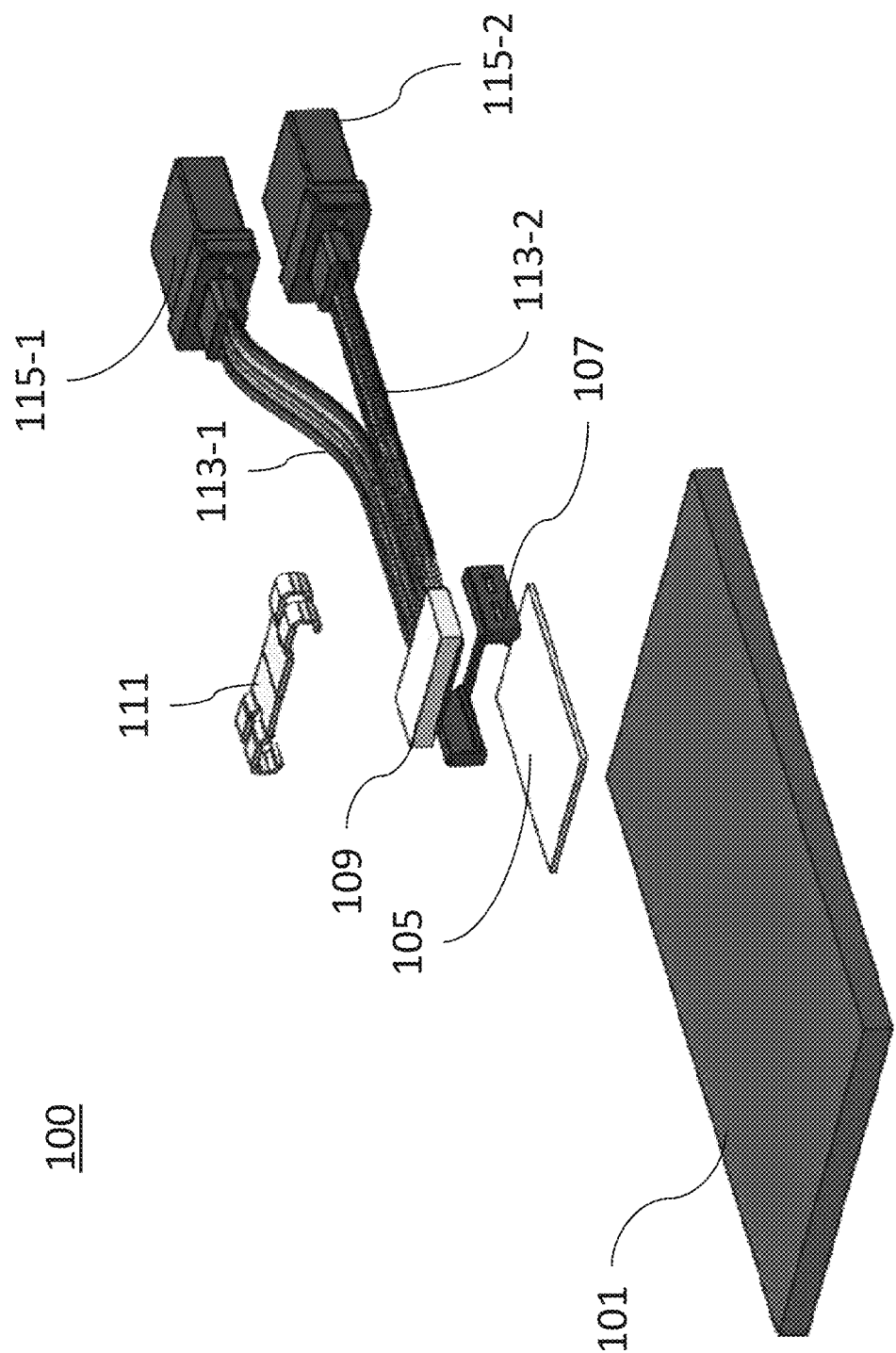
FIG. 2 shows an expanded view of the illustrative embodiment shown in FIG. 1.

FIG. 2 shows an expanded view of the illustrative embodiment 100 that is shown in FIG. 1.

MCM 101 provides for various electrical functions. Typically MCM 101 provides the base for multiple chips mounted thereon that perform various electrical and optical functions. For example, one or more photonic integrated circuits (PICs) 105, may be mounted on MCM 101 although in FIGS. 1 and 2 only a single PIC is shown as a non-limiting example. One or more electronic circuits, e.g., switches and application specific integrated circuits (ASICs), may also be mounted on MCM 101. MCM 101 may itself be mounted on a board (not shown in FIG. 1 or 2). PIC 105 is reflow soldered to MCM 101.

Receptacle 107 is reflow soldered or glued, e.g., using an adhesive, to PIC 105, MCM 101 or a combination thereof. This may be performed, advantageously, using a standard pick and place machine and as such, advantageously, it can be placed with high accuracy. It may be placed during the packaging process, e.g., during the placing of one or more chips, e.g., an ASIC on the MCM.

Figure 3:
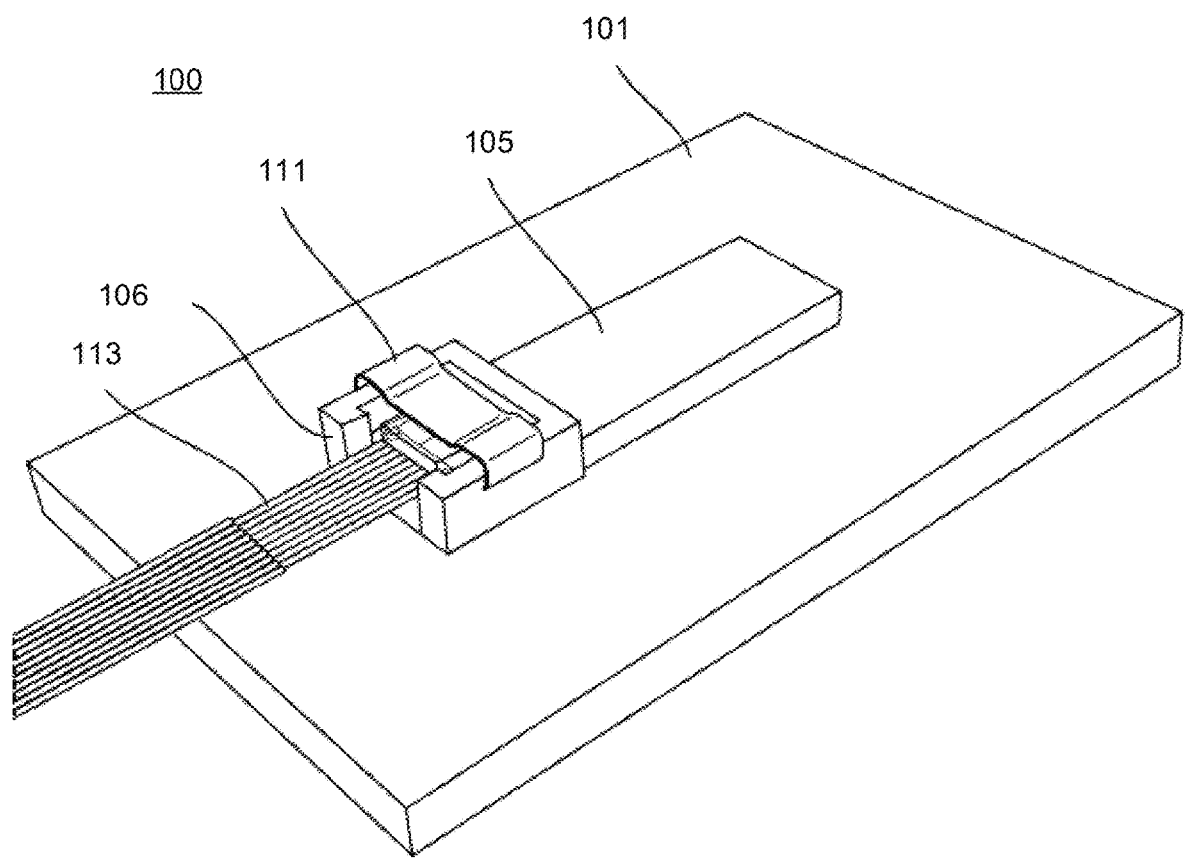
FIG. 3 shows another view of the embodiment of FIG. 1 where a detachable plug die is inserted into a receptacle.
Figure 4:
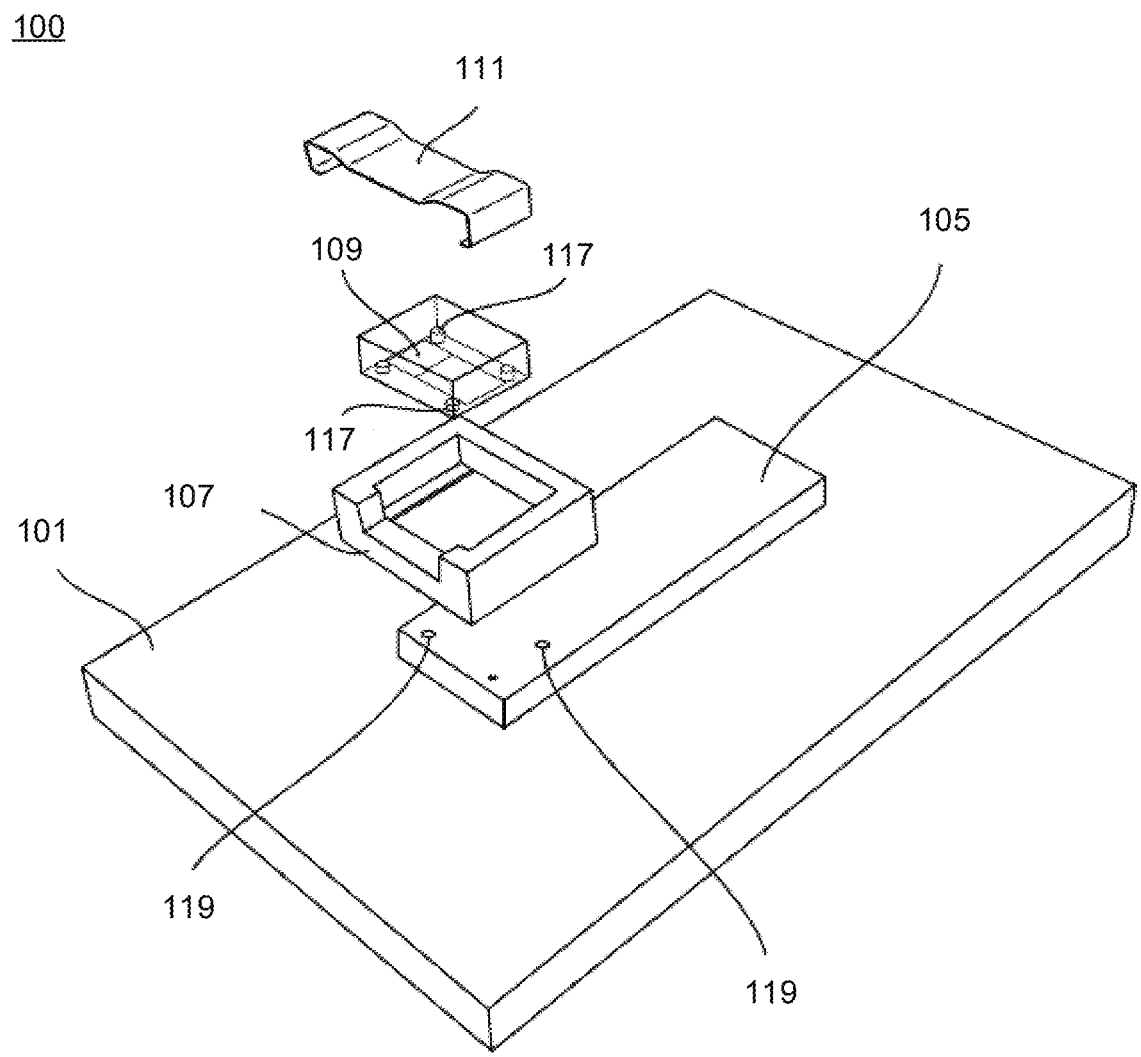
FIG. 4 shows an exploded view of the view of FIG. 3 but without the optical fibers that are shown in FIG. 3.

FIG. 3 shows another view of embodiment 100 where detachable plug die 109 is inserted into receptacle 107. FIG. 4 shows an exploded view of the view of FIG. 3 but without optical fibers 113.

Detachable plug die 109 is described further hereinbelow. Detachable plug die 109 is detachable due to its ability to be inserted into and correspondingly removed from receptacle 107.

Removable clip 111 extends over the top of receptacle 107 and may press down on detachable plug die 109 in order to keep the components in place. In one embodiment, removable clip 111 extends over the top and around two opposing sides of receptacle 107 which it grips to stay in position. Receptacle 107 may have one or more indentations (not shown) to aid clip 111 to remain in place. In one embodiment, clip 111 remains in place due to friction. In one embodiment, clip 111 may be attached to PIC 105 or MCM 101. After being placed, removable clip may be removed to allow detachable plug die 109 and fibers 113 to be separated from PIC 105. Although shown in the embodiments herein as being fully detachable, those of ordinary skill in the art will readily recognize that at least one end of clip 111 may be arranged to be permanently attached to receptacle 107, e.g., using a hinge mechanism.

Figure 5:
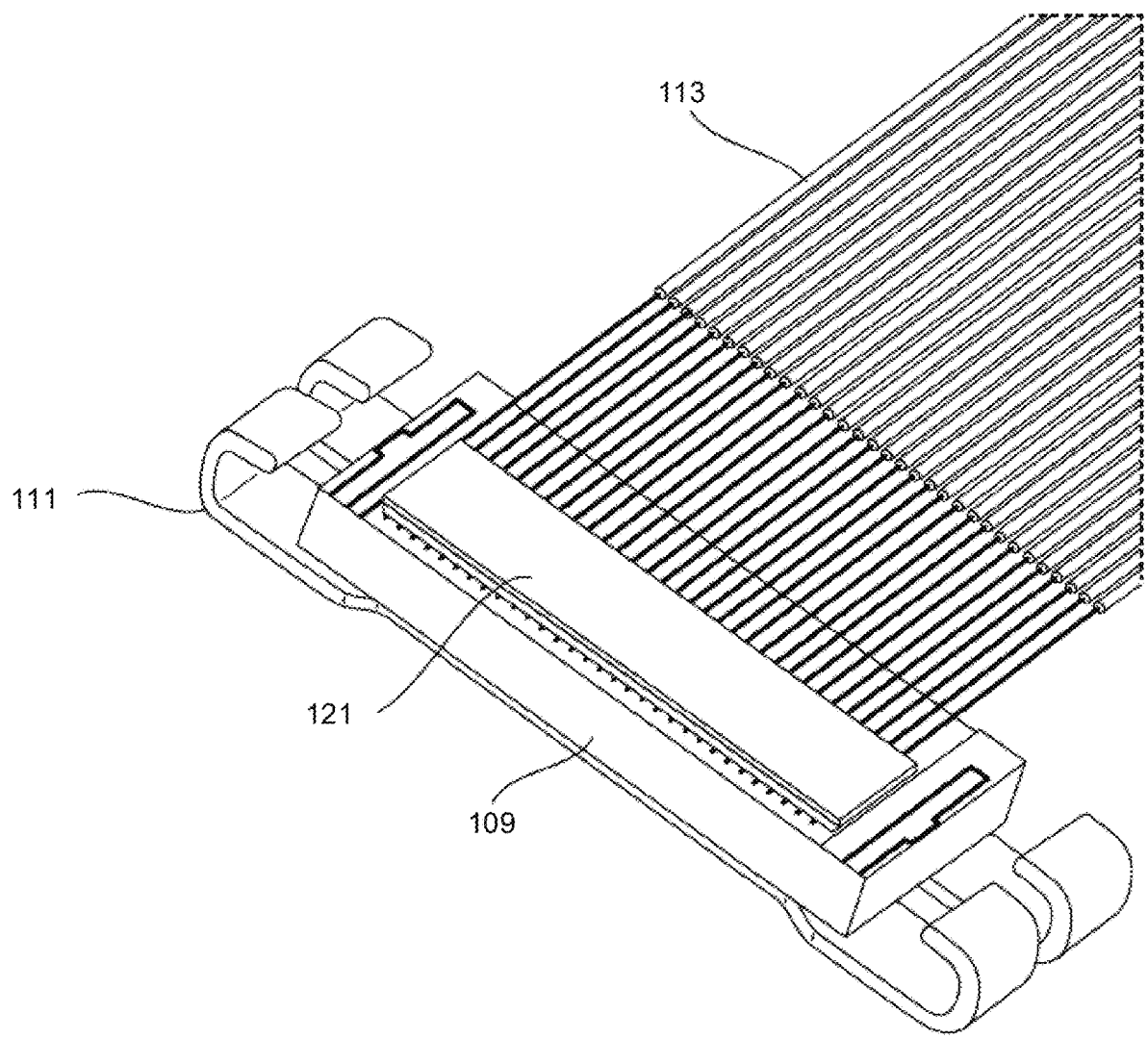
FIG. 5 shows that the individual fibers of a fiber ribbon inserted into trenches of a photonic plug die shown in FIGS. 2 and 4.

FIG. 5 shows that the individual fibers 113 of fiber ribbon 113 are inserted into trenches, e.g., V-grooves, shown in more detail in FIG. 7, formed in detachable plug die 109 to keep them aligned and the trenches are typically in parallel and typically each trench extends part-way across detachable plug die 109 as described further hereinbelow in connection with FIG. 7. The trenches hold the fibers and keeps them aligned, which may be in cooperation with spacer 121 and an adhesive.

Detachable plug die 109, spacer 121, and fiber 113 taken together may be considered to be a detachable photonic plug that can be used to connect optical signals between PIC 105 and the fibers to which fiber ribbon connector couplers 115 are connected. The components of the detachable photonic plug, including detachable plug die 109, fibers 113, and spacer 121 are assembled, e.g., as shown in FIG. 5, prior to being inserted into receptacle 107.

Spacer 121 is used at least in part to control the distance between detachable plug die 109 and PIC 105 so as to enable the proper optical design of the system. Spacer 121 may also be used to at least partially encapsulate and help hold in place fibers 113. To this end, in some embodiments an adhesive may be employed between at least a portion of glass spacer 121 and at least a portion of plug die 109 to keep spacer 121 attached to plug die 109. In some embodiments, adhesive may also be placed within the trenches or around optical fibers 113.

The adhesive should have an appropriate index of refraction so as to minimize optical losses. For example, when optical fibers 113 and spacer 121 is made from fused silica that has an index of refraction around 1.4, in order to minimize optical losses, the index of refraction of the adhesive should be around 1.4 as well. Those of ordinary skill in the art will readily be able to select an adhesive having an appropriate index of refraction based on the materials employed in their various applications. Spacer 121 is optically transparent to at least one wavelength of light being carried by optical fibers 113 and employed by PIC 105. Spacer 121 may be made of any transparent and non-conductive material, such as glass, polydimethylsiloxane, or any other encapsulation material with appropriate refractive index.

Initial insertion of the detachable photonic plug, by initial insertion of detachable plug die 109 thereof, into receptacle 107 provides a rough positioning tolerance of +/−100 µm as a first step before fine alignment. In other words, receptacle 107 will position detachable plug die 109 between −100 µm to +100 µm on both the x and y axis, where 0 µm is the ideal position. When detachable plug die 109 is fully pressed into receptacle 107, fine alignment male features 117, e.g., small male protrusions, of detachable plug die 109, e.g., as seen in FIG. 4, connect to corresponding fine alignment female features 119 of PIC 105, e.g., small recesses, e.g., as seen in FIG. 4, that match the size and shape of fine alignment male features 117, so as to provide +/−5 µm or better fine positioning tolerance for the location of detachable plug die 109. Each of fine alignment male features 117 and fine alignment female features 119 may be produced by wafer level manufacturing processes on both PIC 105 and the detachable plug die 109. Advantageously, such a mechanical structure where the alignment is performed using such alignment features produced at the wafer level provides for superior control of the alignment.

In one embodiment, fine alignment features may be incorporated into spacer 121 in addition to or in lieu of those of detachable plug die 109. In one embodiment, detachable plug die 109 may include alignment features to help insure proper placement of spacer 121.

Figure 6:
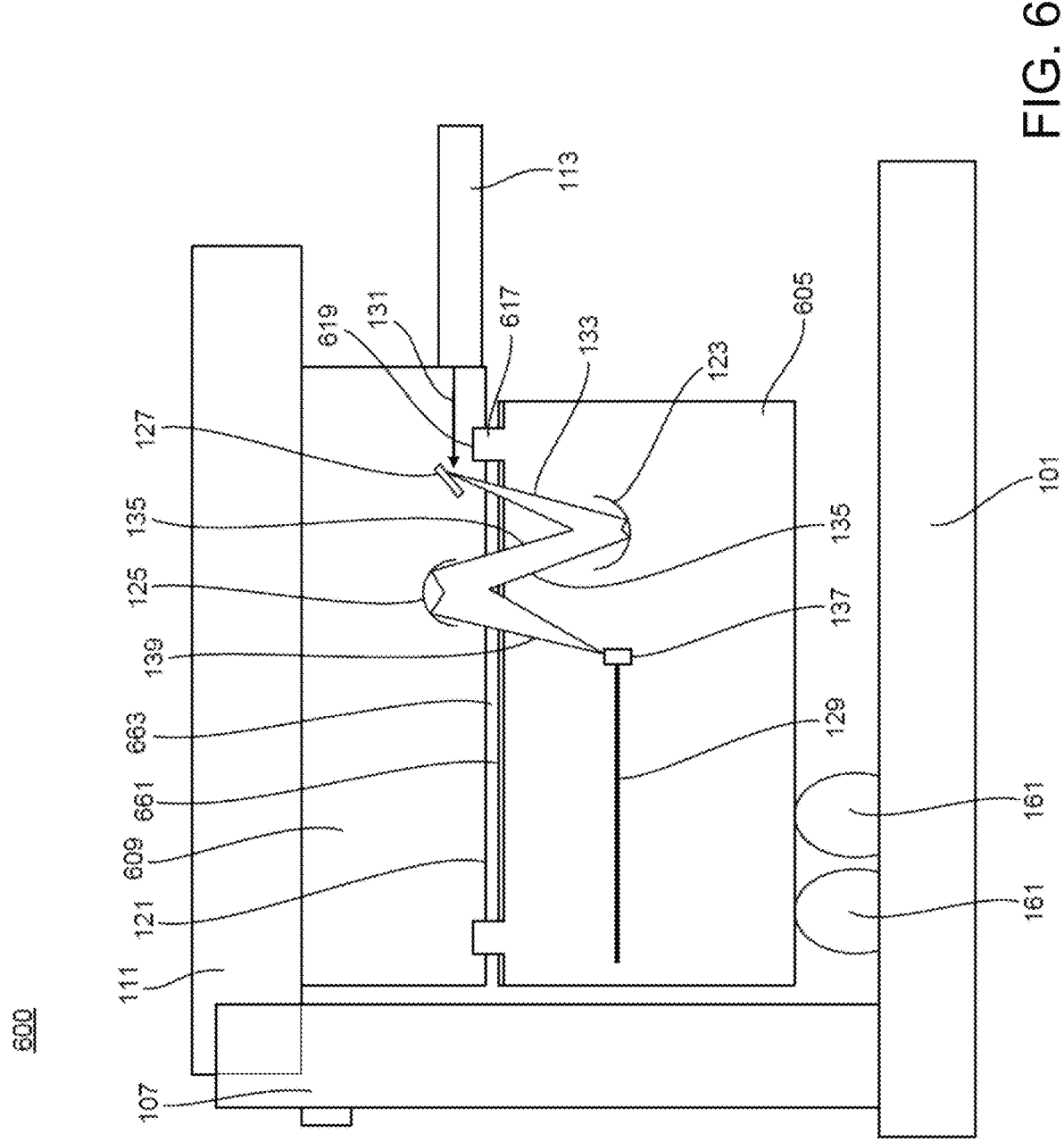
FIG. 6 shows a cross sectional view of an embodiment of a detachable connector when assembled and its optical path.

FIG. 6 shows a cross sectional view of an embodiment 600 of a detachable connector when assembled and the optical path. However, a difference between the embodiment of FIG. 6 and that of FIG. 4 is that in FIG. 6 detachable plug die 609 has female fine alignment features 619 instead of male fine alignment features 119 while PIC 605 has male fine alignment features 617 instead of male fine alignment feature 117. However, from the point of view of light traversing from fiber 113 to PIC 605 via detachable plug die 609, the same path is undertaken when using PIC 105 and detachable plug die 109.

The optical path includes in part a plurality of mirrors, and in particular, first curved mirror 123, second curved mirror 125 and tilted flat mirror 127. Tilted flat mirror 127 is utilized to direct a light beam from optical fiber 113 to first curved mirror 123 and vice-versa. This optical fiber 113 is held in an orientation with respect to PIC 605 so as to ensure that light from PIC 605 goes into optical fiber 113 and vice-versa. Tilted flat mirror 127 may be formed by being etched using a CMOS etching process or in an imprint process. The particular angle employed is based on the optical path between optical fiber 113 and first curved mirror 123 and is selected so that light from tilted flat mirror 127 is reflected to substantially the center of first curved mirror 123.

First and second curved mirrors 123 and 125 are placed so that their respective reflective curved surfaces face in opposite directions to each other. Specifically, first curved mirror 123 is within PIC 605 with its curved reflective surface facing generally toward detachable plug die 609 while second curved mirror 125 is within detachable plug die 609 with its curved reflective surface facing generally toward PIC 605. As a result of the arrangement of the mirrors, light from fiber 113 ultimately is directed into waveguide of PIC 105 and vice-versa, depending on the application. Advantageously, the arrangement of the optical components allows for separation of optical fiber 113 from PIC 605 which facilitates detachability while still providing high and relaxed alignment tolerances in three-dimensions for the coupling of fibers 113 using the detachable photonic plug. In addition, further advantageously, of the optical components enables placement of the detachable plug as a one unit relative to the PIC.

In an embodiment, first and second first curved mirrors 123 and 125 are created using a process such as, but not limited to, grayscale lithography or wafer level optics imprint techniques. In an embodiment, tilted flat mirror 127, second curved mirror 125, and the fiber trenches are formed using the same wafer level manufacturing process with high alignment accuracy.

Further, each of first and second first curved mirrors 123 and 125 are created during fabrication of PIC 605 and detachable plug die 609, respectively, which ensures high accuracy positioning and accurate reflective mirrors. As a non-limiting example, the fabrication process utilized to create first curved mirrors 123 and 125 and tilted flat mirror 127 may include a Silicon-On-Insulator (SOI), complementary metal-oxide semiconductor (CMOS), wafer level optics based imprint processes, and the like.

The disclosed arrangement of the optical coupler achieves high signal efficiency with a relaxed alignment between PIC 605 and the detachable photonic plug as a unit due to the specific locations, shape, and orientation of first and second first curved mirrors 123 and 125. The respective so as to allow a light beam to be reflected from first curved mirror 123 to second curved mirror 125 and vice-versa. Specifically, first and second first curved mirrors 123 and 125 are shaped in such a way that any light beam from a source, which may be one of fibers 113, is reflected and collimated at a certain angle at a center of first curved mirror 123 and focused to a drain, e.g., waveguide 129 of PIC 605, after second curved mirror 125. Likewise, first and second first curved mirrors 123 and 125 are also shaped in such a way that any light beam from a source, e.g., waveguide 129 of PIC 605, is reflected and collimated at a certain angle at a center of second curved mirror 125 and focused to a drain, e.g., which may be one of fibers 113, after being reflected by first curved mirror 123 via tilted flat mirror 127.

Further details of the arrangement of first and second first curved mirrors 123 and 125 are described below with respect to FIG. 8.

More specifically, as shown in FIG. 6, a light beam 131 that was received from optical fiber 113 is reflected by tilted flat mirror 127 as diverging light beam 133 toward first curved mirror 123. Light beam 133 is reflected by first curved mirror 123 as light beam 135 and reach second curved mirror 125. Second curved mirror 125 in turn reflects light beam 135 as focused light beam 139 to back vertical to horizontal propagation converter 137. Vertical to horizontal propagation converter 137 converts received focused light beam 137, which has primarily vertical propagation to a horizontal propagation for light insertion into waveguide 129 of PIC 605. The optical path is the same but in reverse for a light beam transmitted by the waveguide 129.

Vertical to horizontal propagation converters are well known in the art. For example, in one embodiment, vertical to horizontal propagation converter 137 may be a grating coupler. In other embodiments, a tilted-curved mirror or positive tapered structure may be employed individually or in combination as vertical to horizontal propagation converter 137. In yet a further embodiment vertical to horizontal propagation converter 137 may be a butt waveguide coupler, e.g., an out-of-plane butt coupler. Vertical to horizontal propagation converter 137 may also have additional known components that allow it to function as a mode converter in order to adapt the light between the mode size of waveguide 129 and the single mode fiber mode diameter when fiber 113 is a single mode fiber.

In an embodiment, first curved mirror 123 and vertical to horizontal propagation converter 137 are part of a so-called "photonic bump" which added to PIC 105 in a wafer level process. These components are fabricated at the same wafer level process to guarantee high alignment accuracy. However, note that such a bump need not be manufactured at the same time that PIC 105 is manufactured. Therefore, such a photonic bump can be added by another party, i.e., a party who did not manufacture the rest of PIC 105.

In some embodiments, at least one of first curved mirror 123 and second curved mirror 125 is structured to reflect all wavelengths of light incident thereupon.

In some embodiments, spacer 121 is glued, e.g., using an adhesive, to detachable plug die 609 as described above with regard to detachable plug die 109. In some embodiments, additional spacer portion 661 is glued, e.g., using an adhesive, to PIC 605. Additional spacer portion 661 may be made of any transparent and non-conductive material, such as glass, polydimethylsiloxane, or any other index matching material. While the alignment features are shown in FIG. 6 as being on the PIC, in other embodiments they may be made on additional spacer portion 661 or a combination thereof.

In one embodiment of the invention, fine alignment features may be incorporated into additional spacer portion 661 in addition to or in lieu of those of PIC 105. In one embodiment of the invention, PIC 105 may include alignment features to help insure proper placement of additional spacer portion 661.

Due to the detachability of plug die 109 from PIC 105, there may be a gap, e.g., air gap 663, between spacer 121 and additional spacer portion 661. Such a gap may cause mismatches at the boundaries with spacer 121 and additional spacer portion 661 resulting in signal loss. To ameliorate such loss, a layer of antireflective coating may be applied to one or more portions of one or both of the surfaces of spacer 121 and additional spacer portion. More specifically, in some embodiments an antireflective coating layer is applied to at least a portion of the surface of spacer 121 that faces PIC 605. In some embodiments an antireflective coating layer is applied to at least a portion of the surface of additional spacer portion 661 that faces detachable plug die 609. Such antireflective coating maybe a dielectric material may be a layer of magnesium fluoride, although those of ordinary skill in the art will be able to select an antireflective coating suitable to the materials and gap employed. Advantageously, the antireflective coating layers may substantially overcome the difference, i.e., a mismatch, in the index of refraction as light propagates from one medium to another.

The total spacing height between PIC 605 and plug die 609, and in particular the height between the mirrors, which is determined by the total height of spacer 121 which includes any antireflective coating if present, spacer portion 661 which includes any antireflective coating if present, and any gap between them, e.g., gap 663, determines, in part, the efficiency of the transference of a light beam, i.e., optical signal, that is propagating along the optical path. Specifically, the greater the total height is, the less the efficient is the transference. Those of ordinary skill in the art will readily be able to determine an appropriate height for the total spacing and each of its component elements. In an exemplary and non-limiting embodiment, the total height is set to 300-μm.

Although the optical path was described regarding a connection between a single fiber and PIC 605, it will be clear to those of ordinary skill in that the illustrative path may be applied to a plurality of fibers, e.g., all fibers 113 in fiber ribbon 113.

Also shown in FIG. 6 is MCM 101 to which PIC 605 is attached by microbumps 161. Microbumps 161 are each a ball of solder that provides contact between PIC 605 package and MCM 101. In one embodiment, one or more of microbumps 161 may consist of a downsized copper pillar and solder with height of less than 20 μm. Microbumps 161 electronically connect MCM 101 and PIC 605. Typically microbumps 161 connect copper pads on MCM 101 and PIC 605 and soldering is performed by reflow soldering.

FIG. 6 further shows the section of receptacle 107 that is visible in the view of FIG. 6

Detachable plug die 109 may have trenches, e.g., V-grooves, to hold each corresponding fiber 113 so as to properly space them.

Figure 7:
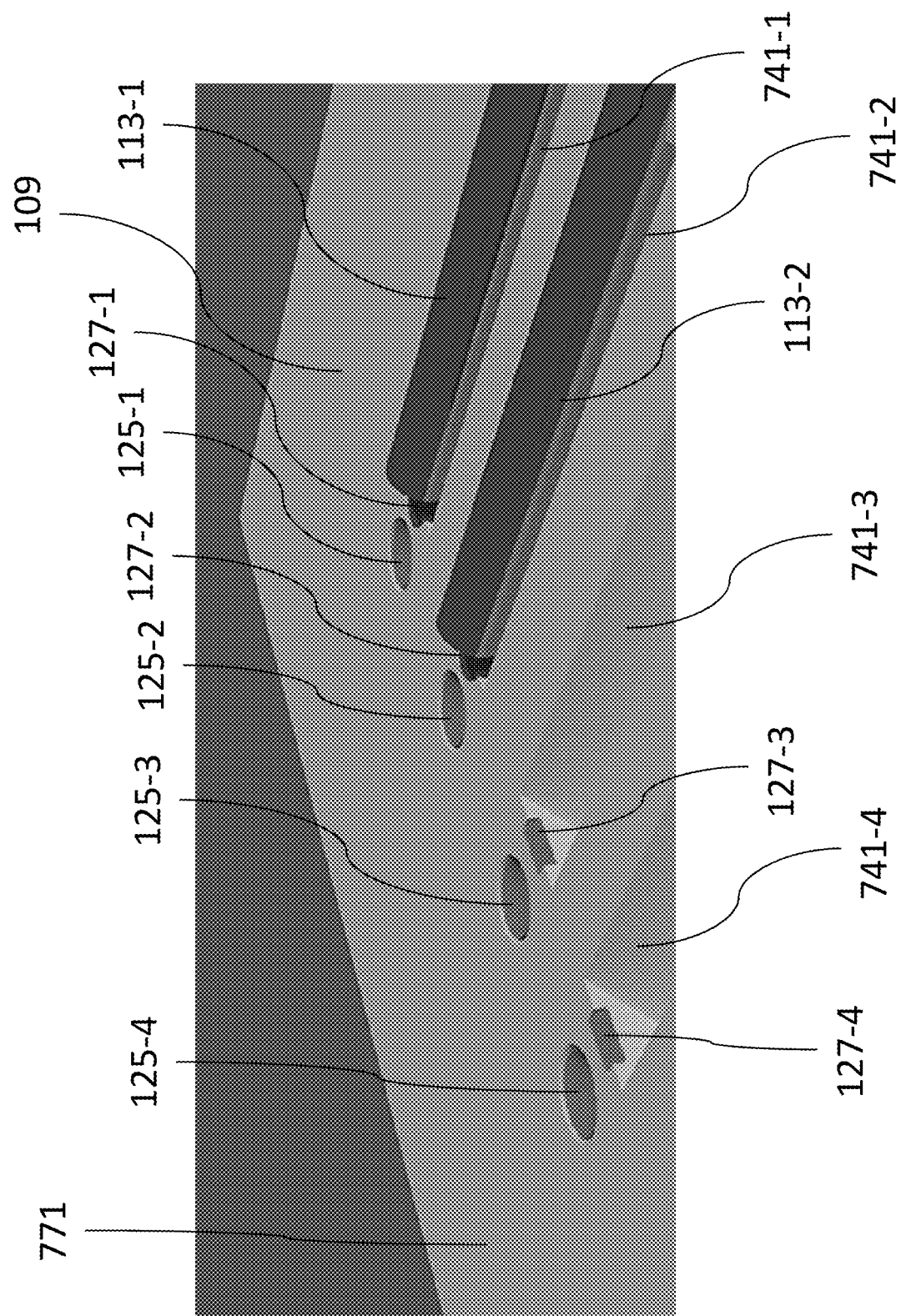
FIG. 7 shows an illustrative surface of a detachable plug in which first curved mirrors and tilted flat mirrors are formed along with trenches for guiding optical fibers.

FIG. 7 shows illustrative surface 771 usable for detachable plugs 109 or 609 in which each second curved mirror 125 and tilted flat mirror 127 are formed. Also, shown in FIG. 7 are trenches, 741, e.g., V-grooves for guiding optical fibers 113. FIG. 7 shows four fiber trenches 741-1 through 741-4. Each fiber trench 741 adjoins a tilted flat mirror 127. In the embodiment shown in FIG. 7 fiber trench 741 is shaped as a V-groove formed in the substrate layer of detachable plugs 109 or 609. Each of fiber trenches 741 may be formed by etching. Each of tilted flat mirrors 127-1 through 127-4 is oriented in the manner described hereinabove. FIG. 7 also shows four second curved mirrors 125-1 through 125-4. Each of second curved mirrors 125 is oriented as is second curved mirror 125 shown in FIG. 6.

It should be noted that only 2 optical fibers 113-1 and 113-2 and four fiber trenches 741 are shown in FIG. 7 for illustrative purposes only. Other numbers of optical fibers and trenches may be utilized without departing from the scope of the disclosed embodiments. It should be further noted that trenches 741 are described as V-grooves. However, any type of groove shape can be utilized, such as square, cylinder, diamond, and the like.

FIG. 7 shows optical fibers 113-1 and 113-2 are placed in the fiber trenches 741-1 and 741-2, respectively. In one embodiment, the height of at least one of fiber trenches 741 is substantially the same as the diameter of a one of optical fibers 113 that is placed therein. Doing so with all of fibers 113 enables spacer 121 to have a flat surface that can be flush against detachable plug dies 109 or 609. However, in other embodiments, spacer 121 may be shaped so as to accommodate other heights for fiber trenches 741. Tilted flat mirrors 127 and second curved mirrors 125 should be positioned to provide for a proper optical path with respect to the depth and orientation of fiber trenches 741. The depths of trenches 741 shown in FIG. 7 and the diameter of fibers 113 shown in FIG. 7 are simply for pedagogical purposes to make it easy to facilitate explanation of the concept and do not reflect any particular preferred or real-world depth, diameter, or optical path.

Processes for creating a fiber trench are well known in the art.

Figure 8:
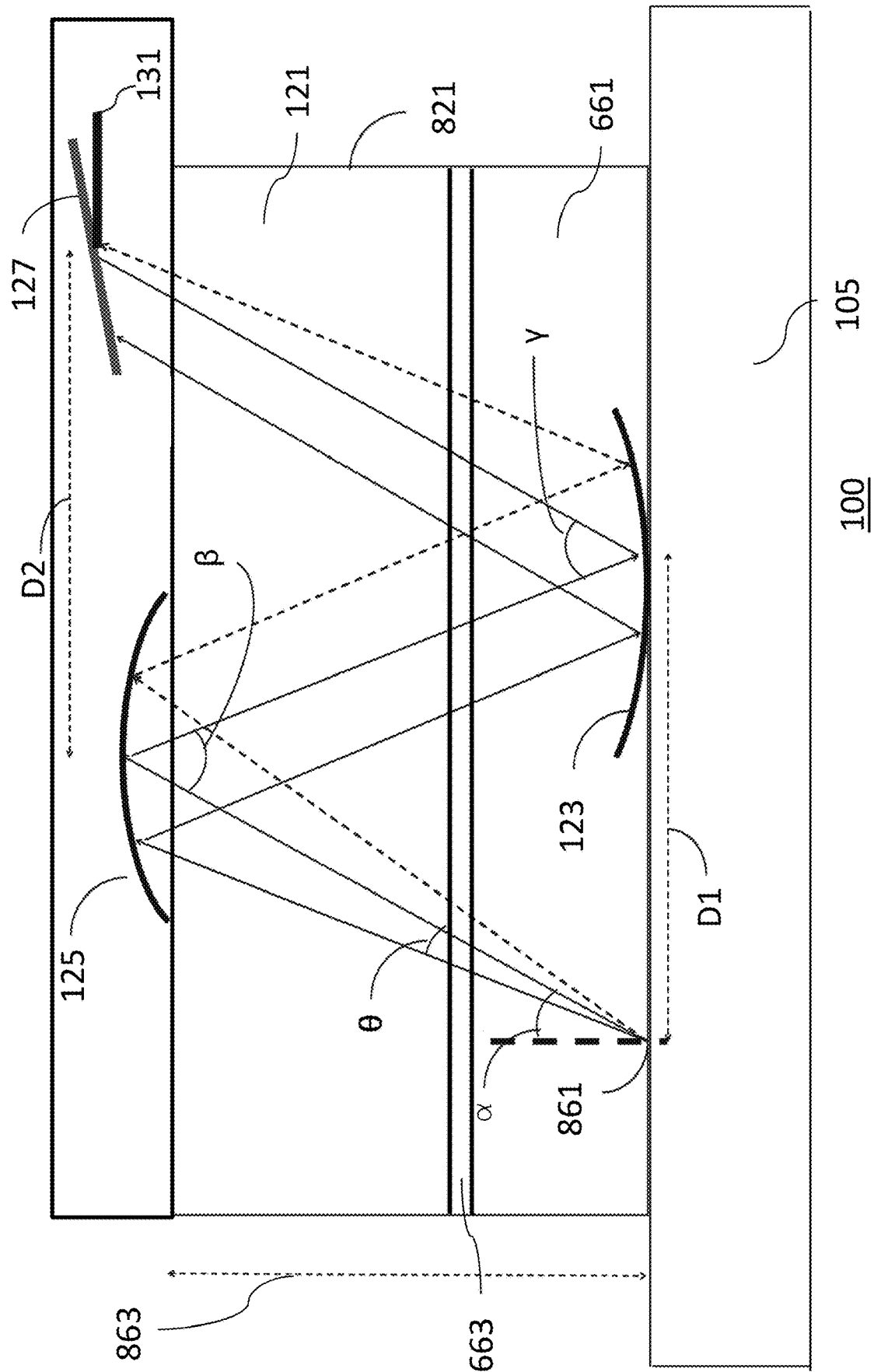
FIG. 8 is an exemplary diagram utilized to describe the angles and distance of an embodiment.

FIG. 8 is an exemplary diagram utilized to describe the angles and distance of coupler 100 according to an embodiment. The embodiment shown in FIG. 8 includes first curved mirror 123, located on PIC 105 along with second curved mirror 125 and tilted flat mirror 127 in detachable plug die 109. Also shown is separation 821. In this example, a drain is optical fiber 113 and an exit point of a waveguide of PIC 105, not shown but see waveguide 129 in FIG. 6, is source 861 for the light beam.

Several adjustable parameters determine the implementation of removable coupler 100, namely, height of separation 821, main propagation angles ($\alpha$, $\beta$, $\gamma$), the propagation medium type of the separation 821, and a target tolerance for misalignment. Separation 821 is composed typically of at least three portions, namely spacer 121, gap 663, and additional spacer portion 661.

The light beam's radius is determined by the light beam's radius at the source 861, the medium in which the beam propagates, and the wavelength of the light beam. First, the angle of divergence ($\theta$) is selected as the angle where the intensity of the light beam is 1% of the intensity at the center of the beam. Then, in an exemplary embodiment, the main propagation angles ($\alpha$, $\beta$, $\gamma$) are set to meet the following constraints:

$$2\alpha = \beta$$

$$\beta = \gamma$$

Typically, the value of $\theta$ is 8°-12°. It should be noted that other constraints may be set to different target tolerances. As noted above, the spacer height 863, represented as L in the equations below, is set based on the allowed tolerances, e.g., for rotation and leveling errors. In an exemplary embodiment, L equals 300 µm.

In an embodiment, first and second curved mirrors 123 and 125 are designed so that when detachable plug die 109 is inserted into receptacle 107 the mirror's respective centers are located where the main propagation axis intersects each respective mirror. Specifically, the mirrors are designed such that the center of second curved mirror 123 is at a distance $D_1$ from the source 861. In an embodiment, the distance $D_1$ is computed as follows:

$$D_1 = 2 \times L \times \tan(\alpha));$$

The center of first curved mirror 125 is at a distance $D_2$ from optical fiber 113 acting as the drain. In an embodiment, the distance $D_2$ is computed as follows:

$$D_2 = 2 \times L \times \tan(\gamma)$$

Further, the lateral distance, to have a substantially 0 µm misalignment between first and second curved mirrors 123 and 125, is computed as follows:

$$L \times \tan(\alpha)$$ In an embodiment, first and second curved mirrors 123 and 125 are shaped in such a way that all light beams from the source 861 are reflected and collimated at the angle $\alpha$ after first curved mirror 123 and focused to optical fiber 113 acting as the drain after being reflected by second curved mirror 125. The surfaces of first and second curved mirrors 123 and 125 are large enough to cover the divergence axis. It should be noted that all calculations are performed under 0 misalignment conditions. Although the embodiments disclosed herein describe the use of curved mirrors for propagating light beams, other arrangements can be realized using other reflective or focusing elements, such as optical lenses, zone plates, e.g., Fresnel zone plates, and the like.

Figure 9:
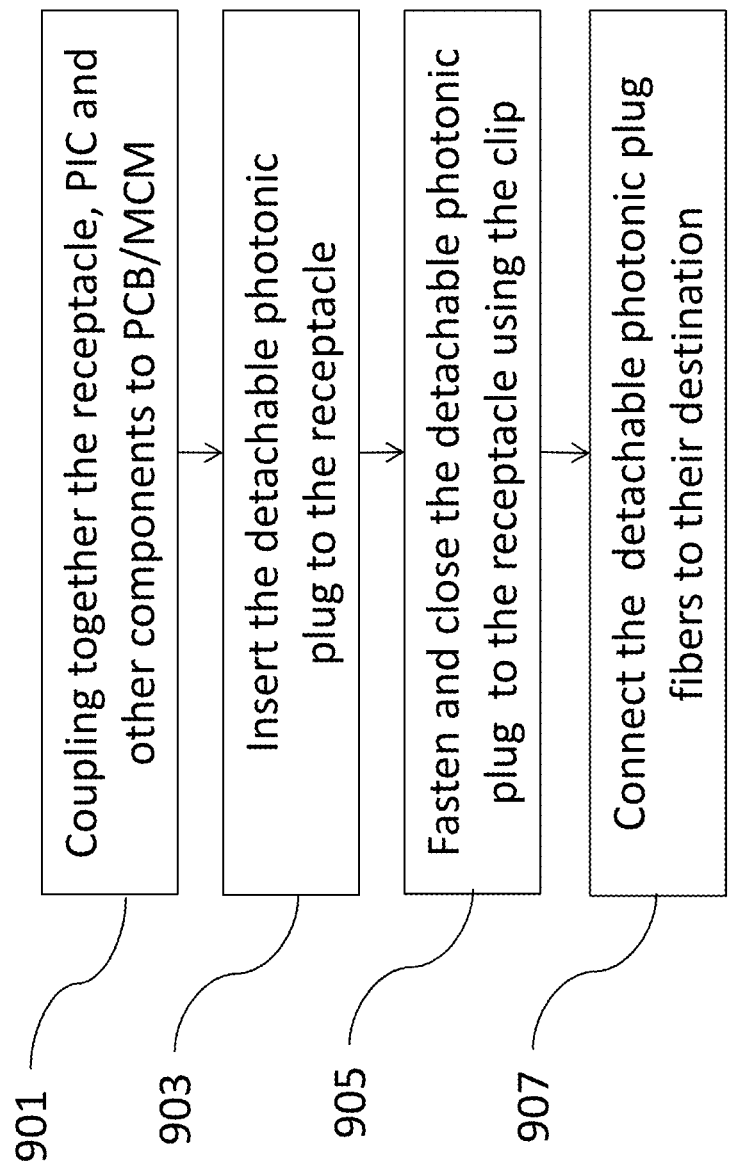
FIG. 9 shows a flowchart of an illustrative process for assembling a detachable plug and connecting an end of fibers to a PIC in accordance with an embodiment.

FIG. 9 shows a flowchart of an illustrative process for assembling a detachable plug and connecting an end of fibers to a PIC in accordance with an embodiment. The process is entered in step 901 in which a receptacle, e.g., receptacle 107, a PIC, e.g. PIC 105 or 605, and any other optional components not part of the detachable fiber plug, are coupled to a MCM, e.g. MCM 101, or a printed circuit board. The printed circuit board may host, or become part of, the MCM. Such coupling may be performed using soldering, adhesive, a combination thereof, and the like and may be different for various items being coupled together. For example, in one embodiment, a portion of the receptacle may be glued, e.g., using an adhesive, to PIC 105. In another embodiment a portion of the receptacle may be soldered, e.g., using reflow soldering, to MCM 101. The PIC may be soldered to the MCM, e.g., as described hereinabove in connection with FIG. 6. As part of the coupling the receptacle is permanently mounted so that at least a portion of the receptacle extends over at least a portion of the PIC, e.g., as shown in FIGS. 1-4 with regards to PIC 105 and receptacle 107.

Next, in step 903, the detachable photonic plug is inserted into the receptacle. Advantageously, this step is performed after any soldering, e.g., reflow soldering, that may be required to form all of the components coupled together in step 901 as well as to perform the coupling of step 901. Advantageously, coupling fibers, e.g., fibers 113, to a PIC, e.g., PIC 105 or 604, is performed after all soldering, e.g., used to assemble an MCM, e.g., MCM 101, is completed.

Thereafter, in step 905, a clip, e.g., clip 111, is employed to close the detachable photonic plug by fastening or securing the detachable photonic plug die, e.g., detachable photonic plug die 109 or 609, within the receptacle.

Lastly, in step 907, the opposite ends of the fibers, i.e., the fiber ends not within the receptacle, are connected to their destination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A detachable photonic plug for coupling an optical fiber to a photonic integrated circuit (PIC), comprising:
    a detachable plug die comprising at least one substantially flat tilted mirror and at least one curved mirror, wherein the at least one substantially flat tilted mirror and the at least one curved mirror are laterally spaced from each other by a predefined distance;
    an optically transparent spacer coupled to the detachable plug die; and
    at least one optical fiber held between the detachable plug die and the optically transparent spacer.

2. The detachable photonic plug of claim 1, wherein the detachable plug die further comprises at least one trench, the at least one optical fiber being located within the at least one trench.

3. The detachable photonic plug of claim 2, wherein the at least one optical fiber is glued within the at least one trench.

4. The detachable photonic plug of claim 2, wherein the at least one trench has a height that at least equals a diameter of the at least one optical fiber.

5. The detachable photonic plug of claim 2, wherein a portion of at least one surface of the optically transparent spacer is substantially flat and substantially flush against a portion of at least one surface of the detachable plug die.

6. The detachable photonic plug of claim 2, wherein a portion of a face of the optically transparent spacer is substantially flat and substantially flush against a portion of a surface of the detachable plug die, the at least one optical fiber, the optically transparent spacer and the detachable plug die being held together by an adhesive.

7. The detachable photonic plug of claim 2, wherein the at least one tilted mirror is located substantially adjacent to an end of the at least one trench at which an end of the at least one optical fiber is located.

8. The detachable photonic plug of claim 1, wherein a portion of a first surface of the optically transparent spacer is coupled to a portion of a surface of the detachable plug die, and wherein a portion of a second surface of the optically transparent spacer, located opposite to the portion of the first surface of the optically transparent spacer, is coated with an anti-reflective coating.

9. The detachable photonic plug of claim 1, wherein the at least one optical fiber is a single mode fiber.

10. The detachable photonic plug of claim 1, wherein the at least one curved mirror is configured to reflect a plurality of wavelengths of light.

11. The detachable photonic plug of claim 1, wherein the substantially flat tilted mirror is positioned at a predefined lateral distance from an end of the at least one optical fiber, the substantially tilted flat mirror being oriented so as to change a light beam from a substantially horizontal orientation defined by a trench of the detachable plug die, in which is located the end of the at least one optical fiber, to a an orientation at an angle to the substantially horizontal orientation.

12. The detachable photonic plug of claim 1, wherein the detachable plug die further comprises at least one fine alignment feature.

13. The detachable photonic plug of claim 1, wherein the optically transparent spacer further comprises at least one fine alignment feature.

14. The detachable photonic plug of claim 1, wherein the detachable plug die is adapted to be inserted into a receptacle located over at least a portion of the PIC for coupling light between the at least one optical fiber and the PIC.

15. The detachable photonic plug of claim 1, wherein the detachable plug die is adapted to be inserted into a receptacle located over at least a portion of the PIC for coupling light between the at least one optical fiber and the PIC, wherein the detachable plug further comprises:
    a removably attached clip to secure the detachable photonic plug within the receptacle.

* * * * *